US012657816B2

(12) United States Patent (10) Patent No.: US 12,657,816 B2
Cho (45) Date of Patent: Jun. 16, 2026

(54) METHOD AND DEVICE WITH SURROUNDING INFORMATION GENERATION

(71) Applicant: SAMSUNG ELECTRONICS CO., LTD., Suwon-si (KR)

(72) Inventor: Hyunwoong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 18/428,042

(22) Filed: Jan. 31, 2024

(65) Prior Publication Data

US 2025/0104338 A1      Mar. 27, 2025

(30) Foreign Application Priority Data

Sep. 27, 2023    (KR) ........................ 10-2023-0130981

(51) Int. Cl.
G06T 17/00 (2006.01)
G01C 21/36 (2006.01)
(52) U.S. Cl.
CPC .......... G06T 17/00 (2013.01); G01C 21/3638 (2013.01)
(58) Field of Classification Search
CPC  G06T 17/00; G01C 21/3638; G01C 21/3804; B60W 40/02; B60W 60/001; B60W 2554/40
USPC ......................................................... 345/419
See application file for complete search history.

(56) References Cited

U.S. PATENT DOCUMENTS

| | | | |
|---|---|---|---|
| 11,599,121 B2 | 3/2023 | Mielenz et al. | |
| 11,630,210 B2 | 4/2023 | Lin et al. | |
| 11,842,528 B2 * | 12/2023 | Wheeler | ................. G06F 18/22 |
| 11,983,933 B1 * | 5/2024 | Pronovost | ............ G06V 10/764 |
| 2023/0036838 A1 | 2/2023 | Slobodyanyuk et al. | |
| 2023/0056589 A1 * | 2/2023 | Trojahner | ......... B60W 60/0016 |
| 2023/0410660 A1 * | 12/2023 | Naserian | ................... B60R 1/22 |
| 2025/0078440 A1 * | 3/2025 | Unzueta | ................... G06T 7/50 |

FOREIGN PATENT DOCUMENTS

| | | |
|---|---|---|
| EP | 4 134 623 A1 | 2/2023 |
| KR | 10-2310608 B1 | 10/2021 |

* cited by examiner

*Primary Examiner* — Benny Q Tieu
(74) *Attorney, Agent, or Firm* — NSIP Law

(57) ABSTRACT

A processor-implemented method includes, based on an overlapping area between a first sensing range of a first sensor and a second sensing range, of a second sensor, that includes an area occluded to the first sensor by an object in the first sensing range, generating an occupancy map by supplementing information about the occluded area among the first point cloud data based on a corresponding portion of the second point cloud data, wherein an acquisition timepoint of the first point cloud data and an acquisition timepoint of the second point cloud data are a same time-point or temporally adjacent to each other, wherein the first point cloud data corresponds to the first sensing range of the first sensor from a perspective of the first sensor of a moving object, where the first sensing range corresponds to a surrounding area of the moving object, and wherein the second point cloud data corresponds to the second sensing range of the second sensor that is remote from the first sensor, where the second sensing range corresponds to a surrounding area of the second sensor.

21 Claims, 5 Drawing Sheets

METHOD AND DEVICE WITH SURROUNDING INFORMATION GENERATION

CROSS-REFERENCE TO RELATED APPLICATIONS

This application claims the benefit under 35 USC § 119 (a) of Korean Patent Application No. 10-2023-0130981, filed on Sep. 27, 2023, in the Korean Intellectual Property Office, the entire disclosure of which is incorporated herein by reference for all purposes.

BACKGROUND

1. Field

The following description relates to a method and device with surrounding information generation.

2. Description of Related Art

An electronic device may be, or include, an autonomous system. For example, the automated driving system may include an advanced driver assistance system (ADAS) that, depending on the level of autonomy, may be capable of automatically driving a vehicle based on recognized surrounding conditions (e.g., driving or other environmental conditions) without the intervention of a driver (or a passenger).

An vehicle with such an automated driving system may perform any of recognition, judgment, path generation, and vehicle control operations. For example, the vehicle may determine the surrounding conditions based on sensing data collected and/or generated by the recognition operation and generate and/or control a driving path of the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes, based on an overlapping area between a first sensing range of a first sensor and a second sensing range, of a second sensor, that includes an area occluded to the first sensor by an object in the first sensing range, generating an occupancy map by supplementing information about the occluded area among the first point cloud data based on a corresponding portion of the second point cloud data, wherein an acquisition timepoint of the first point cloud data and an acquisition timepoint of the second point cloud data are a same timepoint or temporally adjacent to each other, wherein the first point cloud data corresponds to the first sensing range of the first sensor from a perspective of the first sensor of a moving object, where the first sensing range corresponds to a surrounding area of the moving object, and wherein the second point cloud data corresponds to the second sensing range of the second sensor that is remote from the first sensor, where the second sensing range corresponds to a surrounding area of the second sensor.

The generating of the occupancy map may include acquiring a pre-rendered temporary occupancy map for a static object positioned in at least one of the first sensing range or the second sensing range; and generating the occupancy map comprising occupancy information of a dynamic object positioned in at least one of the first sensing range or the second sensing range in at least one of the acquisition timepoint of the first point cloud data or the acquisition timepoint of the second point cloud data.

The generating of the occupancy map may include generating the occupancy map for an area comprising at least a portion of the first sensing range or the second sensing range.

The generating of the occupancy map may include, among a plurality of voxels of the occupancy map, for each voxel comprised in the overlapping area, determining a voxel value of a corresponding voxel using a weight determined based on a distance between a position corresponding to the corresponding voxel and the first sensor and a distance between a position corresponding to the corresponding voxel and the second sensor.

The acquiring of the second point cloud data may include acquiring candidate point cloud data corresponding to each of a plurality of sampling timepoints based on the second sensor; and determining the second point cloud data based on a corresponding piece of candidate point cloud data acquired at a sampling timepoint equal to or temporally adjacent to the acquisition timepoint of the first point cloud data among the acquired candidate point cloud data based on the second sensor.

The determining of the second point cloud data may include determining point cloud data acquired at a sampling timepoint having a determined smallest difference from the acquisition timepoint of the first point cloud data among the plurality of sampling timepoints as temporary point cloud data, in response to all the plurality of sampling timepoints being different from the acquisition timepoint of the first point cloud data; complementing the temporary point cloud data with the acquisition timepoint of the first point cloud data based on velocity information of the second sensor; and determining the complemented temporary point cloud data as the second point cloud data.

The generating of the occupancy map may include acquiring first localization information of the first sensor corresponding to the acquisition timepoint of the first point cloud data; acquiring second localization information of the second sensor corresponding to the acquisition timepoint of the second point cloud data; and supplementing the first point cloud data with the second point cloud data based on the first localization information and the second localization information.

The method may further include determining the second sensor among a plurality of candidate sensors based on a difference between a direction from the moving object to each of the plurality of candidate sensors and a driving direction of the moving object; and generating the second point cloud data based on information captured by the determined second sensor.

The method may further include determining a driving plan comprising a driving path of the moving object based on the generated occupancy map.

The method may further include controlling a driving of the moving object based on the determined driving plan.

In one example, a non-transitory computer-readable storage medium storing instructions that, when executed by a processor, may cause the processor to perform the method described above.

The method may further include generating the first point cloud data based on information captured by the first sensor and the second point cloud based on information captured by the second sensor.

In another general aspect, an electronic device includes a processor configured to: generate first point cloud data corresponding to a first sensing range of a first sensor of a moving object, where the first sensing range corresponds to a surrounding area of the moving object; and based on an overlapping area between the first sensing range and a second sensing range, of a second sensor, that includes an area occluded to the first sensor by an object in the first sensing range, generating an occupancy map by supplementing information about the occluded area among the first point cloud data based on a corresponding portion of the second point cloud data, wherein an acquisition timepoint of the first point cloud data and an acquisition timepoint of the second point cloud data are a same timepoint or temporally adjacent to each other, and wherein the second point cloud data corresponds to the second sensing range of the second sensor that is remote from the first sensor, where the second sensing range corresponds to a surrounding area of the second sensor.

The processor may be further configured to acquire a pre-rendered temporary occupancy map for a static object positioned in at least one of the first sensing range or the second sensing range; and generate the occupancy map comprising occupancy information of a dynamic object positioned in at least one of the first sensing range or the second sensing range in at least one of the acquisition timepoint of the first point cloud data or the acquisition timepoint of the second point cloud data.

The processor may be further configured to generate the occupancy map for an area comprising at least a portion of the first sensing range or the second sensing range.

The processor may be further configured to, among a plurality of voxels of the occupancy map, for each voxel comprised in the overlapping area, determine a voxel value of a corresponding voxel using a weight determined based on a distance between a position corresponding to the corresponding voxel and the first sensor and a distance between a position corresponding to the corresponding voxel and the second sensor.

The processor may be further configured to acquire candidate point cloud data corresponding to each of a plurality of sampling timepoints based on the second sensor; and determine the second point cloud data based on a corresponding piece of candidate point cloud data acquired at a sampling timepoint equal to or temporally adjacent to the acquisition timepoint of the first point cloud data among the acquired candidate point cloud data based on the second sensor.

The processor may be further configured to determine point cloud data acquired at a sampling timepoint having a smallest difference from the acquisition timepoint of the first point cloud data among the plurality of sampling timepoints as temporary point cloud data, in response to all the plurality of sampling timepoints being different from the acquisition timepoint of the first point cloud data; complement the temporary point cloud data with the acquisition timepoint of the first point cloud data based on velocity information of the second sensor; and determine the complemented temporary point cloud data as the second point cloud data.

The processor may be further configured to acquire first localization information of the first sensor corresponding to the acquisition timepoint of the first point cloud data; acquire second localization information of the second sensor corresponding to the acquisition timepoint of the second point cloud data; and supplement the first point cloud data with the second point cloud data based on the first localization information and the second localization information.

The processor may be further configured to determine the second sensor among a plurality of candidate sensors based on a difference between a direction from the moving object to each of the plurality of candidate sensors and a driving direction of the moving object; and generate the second point cloud data based on information captured by the determined second sensor.

The processor may be further configured to determine a driving plan comprising a driving path of the moving object based on the generated occupancy map; and control a driving of the moving object based on the determined driving plan.

Other features and aspects will be apparent from the following detailed description, the drawings, and the claims.

Figure 1:
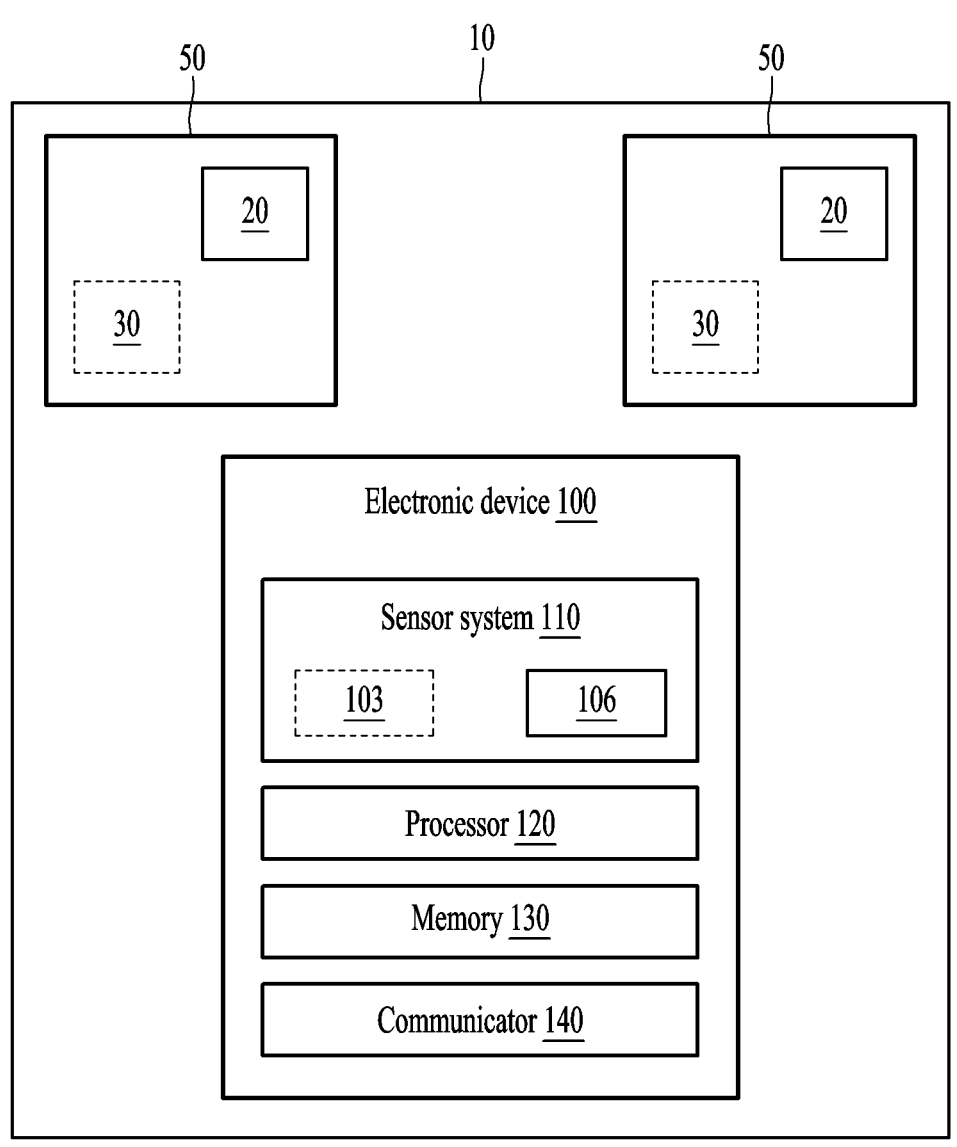
FIG. 1 illustrates an example electronic device with surrounding information generation according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

FIG. 1 illustrates an example electronic device with surrounding information generation according to one or more embodiments.

As illustrated in FIG. 1, a system 10 may include an electronic device 100 and one or more separate sensor systems 50. The electronic device 100 may be configured to obtain, i.e., acquire or generate, first point cloud data based on information collected from a first sensor 103, of a first sensor system 110, having a first sensing range. The electronic device 100 may also be configured to obtain, i.e., acquire or generate, second point cloud data based on information collected from one or more second sensors 20, of the sensor systems 50 (or referred to as second sensor system(s) 50), having a second sensing range. In an example, the second sensor systems(s) 50 may be remote, or separated, from the electronic device 100. In an example, the first sensing range of the first sensor 103 may at least partially overlap with the second sensing range of the second sensor 20.

The sensor system 110 may be included in the electronic device 100 and may include a plurality of sensors 103, or the electronic device 100 may be configured to associate with the sensor system 110. The sensors (e.g., the first sensor(s) and the second sensor(s)) may include at least one of a camera sensor, radar sensor, lidar sensor, or ultrasonic sensor, as non-limiting examples. The camera sensor may generate image data as sensing data by receiving and sensing light (e.g., light in the visible light band) reflected from a physical point (e.g., a point on an obstacle object). In an example, the camera sensor may include a stereo camera sensor and generate depth data indicating the depth of each unit area of image data. The radar sensor may generate radar data by radiating and receiving a radar signal. The lidar sensor may generate lidar data by radiating and receiving light. The ultrasonic sensor may generate ultrasonic data by radiating and receiving ultrasonic waves.

However, the respective sensors 20 and 103 of the sensor systems 50 and 110 are not limited to the foregoing examples, and they each may collect a variety of sensing data. For example, the sensor systems 50 and 110 may respectively include a global navigation satellite system (GNSS) sensor for localization and an inertial measurement unit (IMU) sensor for motion estimation of a moving object. The electronic device 100 may determine the position and motion (e.g., velocity, acceleration, angular velocity, and steering direction) of the moving object based on a GNSS signal and an IMU signal, as non-limiting examples.

A sensing range (e.g., the first or second sensing range) of a sensor (e.g., the first sensor 103 or second sensor 20) may refer to an area in which information may be acquired using signals (e.g., light, a radar signal, and an ultrasonic wave) radiated and/or received from the sensor. The sensing range of the sensor may be an area in a certain distance based on the corresponding sensor but examples are not limited thereto. For example, the sensor may have a sensing direction and sensing area at a certain angle and a certain distance as the sensing range based on the sensing direction.

While an object may exist in the sensing range of the sensor, the object may occlude an area (e.g., an area behind the object from the perspective of the sensor) in the sensing range of the sensor. That is, when an object exists in the sensing range of the sensor, it may be difficult to acquire information about the area occluded by the object depending on the characteristic (e.g., straightness or line of sight) of a corresponding received or captured signal by the sensor. The object positioned in the sensing range may include other objects (e.g., other vehicles), road structures (e.g., a pedestrian bridge and tunnel), or people (e.g., pedestrians) that may be moving from the perspective of the sensor or the corresponding sensor systems 50 or 110, as non-limiting examples.

In an example, while the first sensor 103 may acquire sensing data (e.g., point cloud data) in the first sensing range of the first sensor 103, there may be an area in the first sensing range that is occluded from the perspective of first sensor 103 by the object in the first sensing range, because the second sensor 20 is located at a position that is different from the first sensor 103, the occluded area may be visible to the second sensor 20. Thus, while it may be difficult for the first sensor 103 to acquire all sensing data (e.g., point cloud data) within the first sensing range the second sensor 20 may acquire the sensing data (e.g., the point cloud data) for the occluded area (e.g., the area occluded by the object from the perspective of the first sensor 103). In other words, the first point cloud data generated (e.g., by a processor 106 of the sensor system 110 or by the processor 120 of the electronic device 100) from information captured by the first sensor 103 may not include the corresponding point cloud data for the occluded area, but the second point cloud data generated (e.g., by the processor 30 of the sensor system 50 or by the processor 120 of the electronic device 100) from information captured by the second sensor 20 may include point cloud data for the occluded area. Hereinafter, while there may be other occluded areas from the perspective of the second sensor(s) for which corresponding second point cloud data does not exist in the acquired/generated second point cloud data and which may be supplemented by the first point cloud data through the occupancy map or another occupancy map according to embodiments herein, references below to the occluded area will be referring to an area within the first sensing range for which point cloud data is not provided in the first point cloud data as that area may be occluded by an object, for example, from the perspective of the first sensor(s) when the first point cloud data is acquired or generated based on information captured by the first sensor(s).

The electronic device 100 may be configured to supplement the first point cloud data with a corresponding portion of the second point cloud data that corresponds to the occluded area. The electronic device 100 may be configured to generate an occupancy map in which the information about the occluded area is supplemented based on the first point cloud data and the second point cloud data. In an example, the occupancy map may be an occlusion-free occupancy map.

The occupancy map may store, for a target area of the occupancy map, information of each point (or a partial area) as one of three states: occupied, un-occupied, or unknown. The occupancy map may include voxels in which the target area is divided or partitioned when the target area is a three-dimensional (3D) stereoscopic area, and each voxel may have a voxel value indicating a state of a corresponding voxel. For example, a first voxel value (e.g., 1) may indicate a state where a corresponding voxel is occupied, a second voxel value (e.g., 0) may indicate a state where a corresponding voxel is un-occupied, and a third voxel value (e.g., -1) may indicate a state where a corresponding voxel is unknown.

As non-limiting examples, the target area of the occupancy map may be a 3D stereoscopic area and the occupancy map may include a plurality of voxels. In an example, the target area of the occupancy map may be a two-dimensional (2D) flat area, and include a plurality of pixels (e.g., instead of voxels).

When the electronic device 100 is moving, the first sensor(s) of the sensor system 110 disposed on (e.g., in or on an exterior of) the electronic device 100 may be considered as also moving with and have the first sensing range(s) corresponding to a surrounding area of the electronic device 100, in which case the electronic device 100 may represent a moving object from the perspective of the second sensor 20.

When the electronic device 100 is a vehicle, the vehicle may be an automobile, an aircraft, or watercraft, as non-limiting examples.

The first sensor(s) 103 of the sensor system 110 may collect information related to driving behaviors of the moving electronic device 100. As non-limiting examples, the first sensor(s) 103 may include at least one of a camera sensor, radar sensor, lidar sensor, infrared sensor, or ultrasonic sensor, and may be disposed on any or any combination of the front, rear, side surface, upper surface, or lower surface of the electronic device 100.

The electronic device 100 may generate the occupancy map based on the first point cloud data based on information captured by the first sensor(s) to control the movement of the electronic device 100 equipped with the first sensor(s). The electronic device 100 may supplement the first point cloud data, i.e., for area(s) that are occluded from the perspective of the first sensor(s) 103 of the electronic device 100, using the second point cloud data, acquired by the second sensor(s) 20 from the perspective of the second sensor(s) 20, when the electronic device 100 determines that there is at least one area in the first sensing range that is occluded (e.g., by the object) from the perspective of the first sensor(s) 103 and not included the first point cloud data. In addition, the electronic device 100 may use the second point cloud data acquired (e.g., as generated by processor 30 of the sensor system 50 or as generated by processor 120) based on information captured by the second sensor(s) 20 to acquire/generate point cloud data (or the occupancy map) from the perspective of the first sensor(s) 103 for other areas not included in the first sensing range, i.e., areas outside of the first sensing range but within the second sensing range of the second sensor(s) 20, as these other areas may be related to a driving plan (e.g., a driving path) of the electronic device 100.

Referring to FIG. 1, the electronic device 100 may include the sensor system 110, a processor 120, a memory 130, and a communication system 140. The electronic device 100 may also be associated with the sensor system 110.

The sensor system 110 (or another processor of the electronic device 100) may acquire point cloud data. For example, the sensor system 110 may use a sensor 103 (e.g., the first sensor) to capture information and may generate the first point cloud data, based on the captured information, which may then be acquired by the processor 120 (e.g., using the communication system 140), or the captured information may be provided to the processor 120 that then generates the first point cloud data. The sensor system 110 may generate the first point cloud data for the first sensing range of the first sensor based on sensing data collected from the first sensor. As noted, the processor 120 or the processor 106 of the electronic device 100, or the processor 30 of the sensor system 50, may generate the second point cloud data for the second sensing range of the second sensor 20 based on sensing data collected from the second sensor 20.

In an example, the electronic device 100 may include the first sensor 103, and the sensor system 110 or the processor 120 may acquire the first point cloud data by processing sensing data of the first sensor 103 and receive, (e.g., using the communication system 140), information about the second point cloud data from the sensor system 50 (e.g., of the other electronic device 100) including the second sensor 20.

The sensor system 50 of the other electronic device 100 may acquire the second point cloud data by processing sensing data of the second sensor 20. In an example, the electronic device 100 may or may not include the sensor system 110, and may acquire/generate the first and second point cloud data based on information captured by the sensors 20 of the sensor system 50.

The processor 120 may generate the occupancy map based on the first point cloud data and the second point cloud data. For example, the processor 120 may supplement, in the occupancy map and from the perspective of the first sensor (s) 103, with information of the occluded area from the second point cloud data. In an example, the occupancy map may be an occlusion-free occupancy map.

The processor 120 may be a single processing element or several processing elements, all of which may include multiple hardware computing components. The processor 120 may be implemented as one or more microprocessors, microcomputers, microcontrollers, digital signal processors, central processing units, state machines, logic circuits, and/ or any electronic devices that manipulate signals based on operational instructions. Among other functions, the processor 120 may be configured to fetch and execute computer-readable instructions and data stored in the memory 130.

The memory 130 may temporarily and/or permanently store at least one of the first point cloud data, the second point cloud data, information regarding the object, information regarding the occluded area, and/or the occupancy map. The memory 130 may store instructions for acquiring and/or generating the first point cloud data and the second point cloud data and/or generating the occupancy map. However, this is only an example, and information stored in the memory 130 is not limited thereto.

The memory 130 may include any non-transitory computer-readable medium known in the art including, as non-limiting examples, volatile memory, such as static random access memory (SRAM) and dynamic random access memory (DRAM), and/or non-volatile memory, such as read-only memory (ROM), erasable programmable ROM, flash memory, hard disks, optical disks, and magnetic tape.

The communication system 140 may transmit and receive at least one of the first point cloud data, the second point cloud data, or the occupancy map to and from another electronic device or server. As non-limiting examples, the communication system 140 may establish a wired communication channel and/or a wireless communication channel with an external device (e.g., another electronic device or a server) and may establish communication through cellular communication, short-range wireless communication, local area network (LAN) communication, Bluetooth, wireless fidelity (Wi-Fi) direct or infrared data association (IrDA), or a long-range communication network such as a legacy cellular network, a fourth generation (4G) and/or fifth generation (5G) network, next generation communication, the Internet, or a computer network (e.g., a LAN or wide area network (WAN)).

Figure 2:
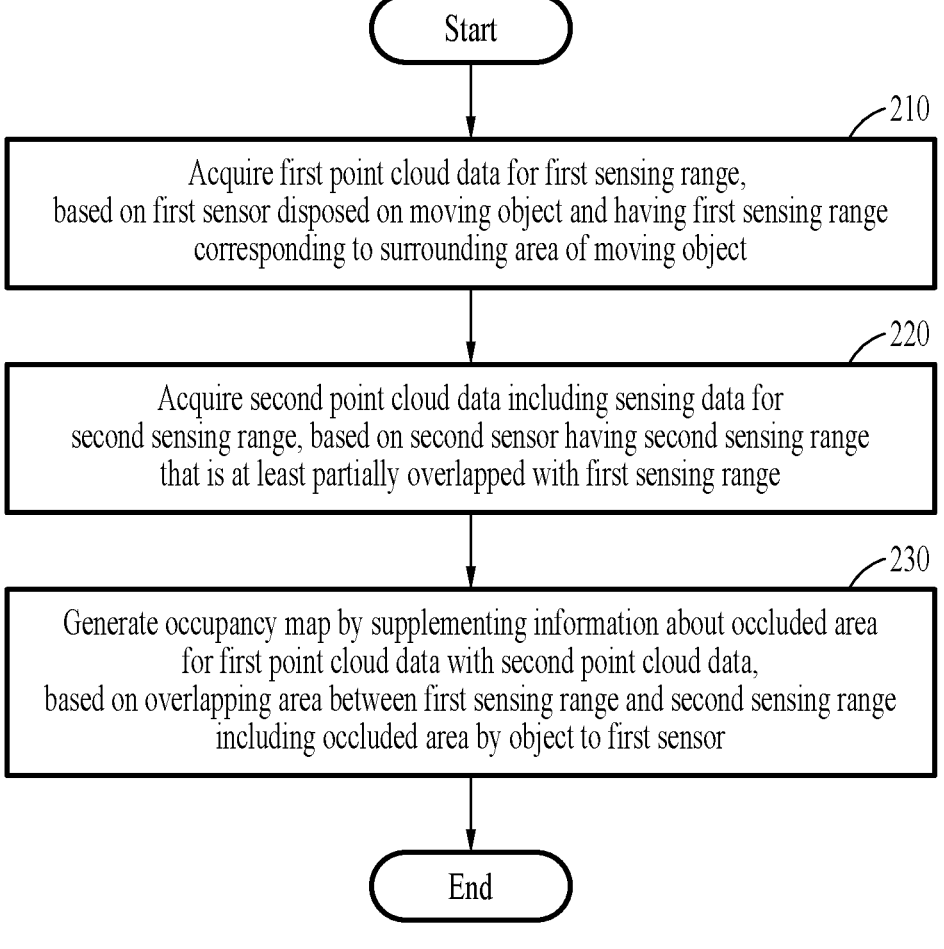
FIG. 2 illustrates an example method with surrounding information generation according to one or more embodiments.

FIG. 2 illustrates an example method with occupancy map generation by an electronic device according to one or more embodiments. The method may include operations 210 through 230 as a non-limiting example. These operations of the method may be performed by an electronic device (e.g., the electronic device 100 in FIG. 1) or a processor (e.g., the processor 120 of the electronic device 100), or any of the processors 30 of the sensor system 50.

The electronic device may generate the occupancy map for a moving object (e.g., any of the electronic devices 100 or the sensor system 50 of FIG. 1, any of which may be stationary fixed in a moving location, or capable of mechanical movement, hereinafter referred to as the moving object), using the first point cloud data based on first sensor(s) (e.g., of the electronic device 100), and the second point cloud data based on the second sensor(s) (e.g., located at other electronic device 100 or the sensor system 50, hereinafter referred to as the second object). The electronic device may determine a driving plan (e.g., a driving path) of the moving object and/or control the moving object based on the generated occupancy map.

In operation 210, the electronic device may acquire and/or generate the first point cloud data for the first sensing range based on the first sensor.

The first sensor(s) may be disposed in or on the first object (e.g., the moving object). The first sensor(s) may have the first sensing range corresponding to the surrounding area of the moving object. The position and pose of the moving object may be changed while driving of the moving object and the position and pose of the first sensor(s) may also be changed. The first sensing range may be changed based on the position and/or pose of the moving object (or the first sensor(s)). For example, at a plurality of timepoints in a time interval in which the moving object moves, a corresponding first sensing range may be determined based on the position and pose of the moving object (or the first sensor) at a corresponding timepoint.

The first sensor is mainly described as being disposed on the moving object but is not limited thereto. The first sensor may be installed on a structure at a fixed position.

In operation 220, the electronic device may acquire and/or generate the second point cloud data including the sensing data for the second sensing range based on the second sensor(s). The second sensor(s) may have the second sensing range that is at least partially overlapped with the first sensing range.

The second sensor(s) may be disposed in or on the second object(s) (e.g., any of the other electronic devices, separated/ remote sensor systems, or other objects that are different from the moving object that includes the first sensor(s)). Similar to the first sensor disposed on the moving object, the position and pose of the second object(s) and the second sensor(s) may be changed in a case that the second object(s) moves, and the second sensing range may also be changed. As will be described in more detail in operation 230, the electronic device may generate the occupancy map based on localization information of the sensor(s) (e.g., the first sensor and/or the second sensor) when at least one of the first sensor or the second sensor is disposed on the moving object.

The second sensor may be installed on a structure at a fixed position. As a non-limiting example, the second sensor may be attached to a structure such as a lamppost, power pole, or sign.

The point cloud data (e.g., the first point cloud data and the second point cloud data) may have a position (e.g., an x-axis coordinate, y-axis coordinate, and z-axis coordinate) of a corresponding point and the intensity of a signal for the corresponding point.

For example, point cloud data P may be expressed as follows.

$$P_i = \{x_i, y_i, z_i, I_i\}, i = 1, \ldots, N \qquad \text{[Equation 1]}$$

Here, $P_i$ denotes an i point of point cloud data P, $x_i$ denotes an x-coordinate of the i point, $y_i$ denotes a y-coordinate of the i point, $z_i$ denotes a z-coordinate of the i point, $I_i$ denotes the intensity of a signal for the i point, and N is an integer greater than or equal to 1 and denotes the number of points of the point cloud data P.

In operation 230, the electronic device may generate the occupancy map based on the first point cloud data and the second point cloud data.

The occupancy map may include occupancy information of the target area. The occupancy information may refer to information indicating whether a corresponding area (e.g., the target area) is occupied. For example, the occupancy information may represent, for each voxel of the target area, at least one state of the following: a corresponding voxel is occupied, un-occupied, or occupancy of a corresponding voxel is unknown.

The electronic device may generate the occupancy map for an area (e.g., the target area) including at least a portion of the first sensing range or the second sensing range. For example, the target area of the occupancy map may include the first sensing range (or the surrounding area of the moving object). In another example, the target area of the occupancy map may include at least a portion of the first sensing range and/or at least a portion of the second sensing range.

An overlapping area between the first sensing range and the second sensing range may include the occluded area by the object to the first sensor(s). The electronic device may supplement the information about the occluded area with the second point cloud data. For example, the supplementation may include including the appropriate point cloud data regarding the occluded area from the second point cloud data in the occupancy map. An example in which the overlapping area between the first sensing range and second sensing range includes the occluded area will be described in more detail with reference to FIG. 3 below.

An acquisition timepoint of the first point cloud data and an acquisition timepoint of the second point cloud data may be equal to or temporally adjacent to each other. For example, the first point cloud data may be generated based on the sensing data sensed by the first sensor at a first timepoint. The second point cloud data may be generated based on the sensing data sensed by the second sensor at a second timepoint. The first timepoint and the second timepoint may be the same timepoint. Alternatively, the first timepoint may be different from the second timepoint such that a difference between the first time point and the second time point is less than or equal to a threshold time length.

The electronic device may use the second point cloud data acquired at the timepoint equal to or temporally adjacent to the acquisition timepoint of the first point cloud data to supplement the occluded area with the second point cloud data. In an example, the object (e.g., an object A) that occludes a partial area (e.g., the occluded area) within the first sensing range and/or an occluded object (e.g., an object B in the occluded area that is occluded by object A) may be dynamic objects. When the difference between the acquisition timepoint of the first point cloud data and the acquisition timepoint of the second point cloud data is greater than or equal to a threshold time length, for example, due to the movement of the dynamic object (e.g., the object A and/or the object B), the occupancy information of the object (e.g., the object A) that occludes a portion of the first sensing range to the first sensor and/or the occluded object (e.g., the object B) at the acquisition timepoint of the first point cloud data may be different from the occupancy information of the object that occludes a portion of the first sensing range to the first sensor and/or the occluded object at the acquisition timepoint of the second point cloud data. Accordingly, the electronic device may supplement the occluded area among the first point cloud data at the acquisition timepoint of the first point cloud data with the second point cloud data using the second point cloud data acquired at the timepoint equal to or adjacent to the acquisition timepoint of the first point cloud data, thereby generating an occlusion-free occupancy map.

The electronic device may determine a voxel value of each voxel of the occupancy map based on the first point cloud data and/or the second point cloud data. For example, the electronic device may determine, among a plurality of voxels of the occupancy map, a voxel value of a corresponding voxel included in the overlapping area between the first sensing range and the second sensing range based on the first point cloud data and the second point cloud data. The electronic device may use more point cloud data based on a sensor that is closer to a position corresponding to the corresponding voxel between the first sensor and the second sensor than point cloud data based on a sensor that is away from the position to generate occupancy map.

For example, the electronic device may determine a weight for the first point cloud data and/or the second point cloud data based on a distance between a position corresponding to a corresponding voxel and the first sensor and a distance between a position corresponding to a corresponding voxel and the second sensor. The electronic device may determine a voxel value of a corresponding voxel based on the determined weight. The weight for the point cloud data may refer to the influence on determining the occupancy information of a corresponding voxel by the point cloud data.

For example, the electronic device may determine the weight for the first point cloud data as a greater value and/or determine the weight for the second point cloud data as a less value as a corresponding voxel gets closer to the first sensor. Similarly, the electronic device may determine the weight for the first point cloud data as a less value and/or determine the weight for the second point cloud data as a greater value as a corresponding voxel gets closer to the second sensor.

For example, the electronic device may determine a second weight for the second point cloud data as a greater value than a first weight for the first point cloud data when a corresponding voxel gets closer to the second sensor than the first sensor. Similarly, the electronic device may determine the second weight for the second point cloud data as a less value than the first weight for the first point cloud data when a corresponding voxel gets away from the second sensor than the first sensor.

The electronic device may supplement the first point cloud data with the second point cloud data to generate an occlusion-free occupancy map based on localization information of the first sensor and the second sensor. The localization information of sensors may include at least one of information (hereinafter, referred to as "position information") corresponding to the position of the sensors or information (hereinafter, referred to as "pose information") corresponding to the pose of the sensors"). When the sensors are disposed on the moving object, the localization information of the sensors may be interpreted as correspondence to localization information of the moving object.

For example, the electronic device may acquire first localization information of the first sensor corresponding to the acquisition timepoint of the first point cloud data. The electronic device may acquire second localization information of the second sensor corresponding to the acquisition timepoint of the second point cloud data. The electronic device may supplement the first point cloud data with the second point cloud data to generate an occlusion-free occupancy map based on the first localization information and the second localization information.

Although not clearly shown in FIG. 2, the electronic device may control the driving of the moving object on which the first sensor is disposed based on the generated occupancy map. The electronic device may determine the driving plan including the driving path of the moving object based on the generated occupancy map. The electronic device may control the driving of the moving object based on the determined driving plan.

In an example, the electronic device may establish a driving plan in which an object A (e.g., the moving object on which the first sensor is disposed) is heading to a destination while preventing collision with an object B in the surrounding area. The driving plan may include a driving path in which the moving object A is heading to at least one of a travel destination or an intermediate destination based on a driving maneuver of a user. The travel destination may be the final destination of the moving object specified by the user (e.g., a driver). The intermediate destination may represent a stopover point on the road while heading to the travel destination or an intermediate point determined by the driving maneuver (e.g., a maneuver of turning on the turn signal as an intentional maneuver to change the direction of the vehicle or change the lane) of the user. For example, when the driving maneuver intended to change the lane is input to the electronic device by the user while driving, the electronic device may set a point on the lane to be changed as the intermediate destination.

The electronic device may determine, based on the occupancy map, the driving plan including the driving path including areas that are un-occupied in the surrounding area of the moving object. The electronic device may control at least one of the velocity, acceleration, or steering of the vehicle based on the determined driving plan.

The first sensor (or a device including the first sensor) may be expressed as a 'main sensor' (or a 'main device') in that the sensor disposed on the moving object in which the electronic device determines the driving plan and/or controls the driving is the first sensor. The second sensor (or a device including the second sensor) may be expressed as an 'auxiliary sensor' (or an 'auxiliary device') in that the sensing data to supplement the sensing data of the first sensor is provided.

Figure 3:
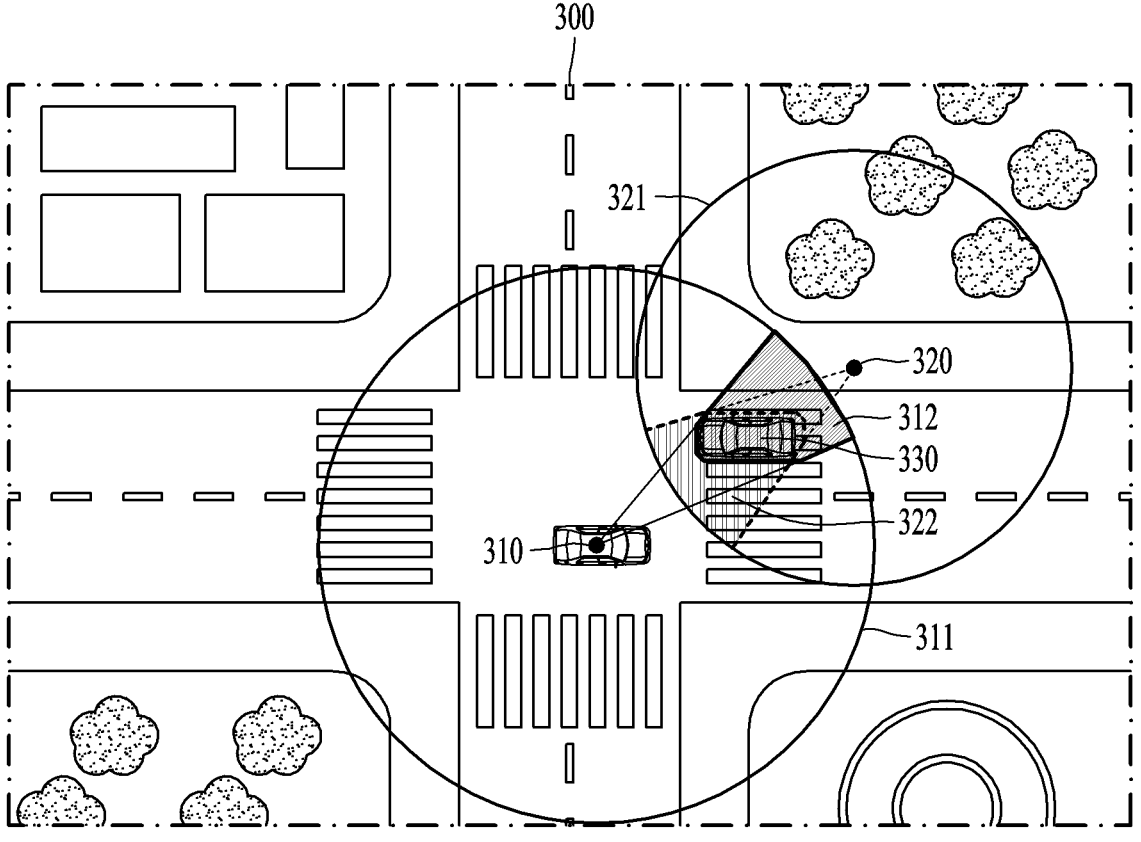
FIG. 3 illustrates an example area occluded by an object in a sensing range of a sensor system according to one or more embodiments.

FIG. 3 illustrates an example of an occluded area, i.e., an area occluded by an object in a sensing range, according to one or more embodiments.

An electronic device (e.g., the electronic device 100 in FIG. 1) may supplement the first point cloud data based on a first sensor 310 with the second point cloud data based on a second sensor 320 to generate an occlusion-free occupancy map.

In a situation 300 in FIG. 3, the first sensor 310 may acquire sensing data from a first sensing range 311. The second sensor 320 may acquire sensing data from a second sensing range 321. In FIG. 3, for the simplification of description, the first sensor 310, the first sensing range 311, the second sensor 320, and the second sensing range 321 may be shown in a direction looking at a ground in a direction perpendicular to the ground.

An object 330 may be positioned in an overlapping area between the first sensing range 311 and the second sensing range 321. As shown in FIG. 3, a partial area 312 in the first sensing range 311 may be occluded by the object 330 to the first sensor 310. In addition, a partial area 322 in the second sensing range 321 may be occluded by the object 330 to the second sensor 320.

The electronic device may supplement, for driving of the moving object on which the first sensor 310 is disposed, the first point cloud data with the second point cloud data based on the second sensor 320 capable of sensing the partial area 312 among the first point cloud data to acquire the occupancy map for the surrounding area of the moving object, so that the occupancy map becomes an occlusion-free occupancy map.

Figure 4:
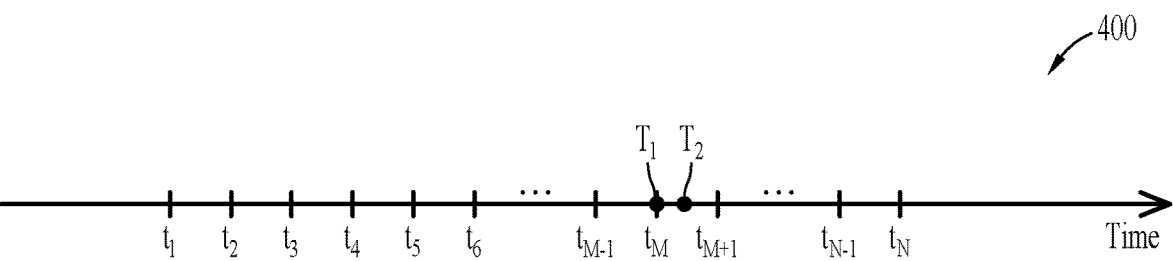
FIG. 4 illustrates an example acquisition of second point cloud data according to one or more embodiments.

FIG. 4 illustrates an example acquisition of second point cloud data according to one or more embodiments.

An electronic device (e.g., the electronic device 100 in FIG. 1) may acquire the second point cloud data acquired at the timepoint equal to or temporally adjacent to the acquisition timepoint of the first point cloud data.

The electronic device may acquire candidate point cloud data corresponding to each of a plurality of sampling timepoints based on the second sensor.

In a time graph 400 in FIG. 4, the electronic device may acquire the candidate point cloud data through the second sensor at each of the plurality of sampling timepoints (e.g., a first sampling timepoint t1, a second sampling timepoint t2, . . . , an N–1th sampling timepoint tN–1, and an Nth sampling timepoint tN). The candidate point cloud data may refer to point cloud data acquired over at least one sampling timepoint.

The electronic device may determine, among the candidate point cloud data acquired based on the second sensor, the second point cloud data based on a corresponding piece of the candidate point cloud data acquired at the sampling timepoint equal to or temporally adjacent to the acquisition timepoint of the first point cloud data.

The electronic device may determine, among the candidate point cloud data, a corresponding piece of candidate point cloud data acquired at the sampling timepoint having the smallest difference from the acquisition timepoint of the first point cloud data as the second point cloud data.

For example, one of the plurality of sampling timepoints may be equal to the acquisition timepoint of the first point cloud data. The electronic device may determine candidate point cloud data acquired at the sampling timepoint that is equal to the acquisition timepoint of the first point cloud data as the second point cloud data. For example, in FIG. 4, when the acquisition timepoint of the first point cloud data is a timepoint T1, the electronic device may determine candidate point cloud data acquired at a sampling timepoint tM that is equal to the timepoint T1 as the second point cloud data.

In another example, the electronic device, when all the plurality of sampling timepoints are different from the acquisition timepoint of the first point cloud data, among the plurality of sampling timepoints, may determine candidate point cloud data acquired at the sampling timepoint closest to the acquisition timepoint of the first point cloud data as the second point cloud data. For example, in FIG. 4, when the acquisition timepoint of the first point cloud data is a timepoint $T_2$, all the plurality of sampling timepoints (e.g., the first sampling timepoint $t_1$, the second sampling timepoint $t_2$, . . . , the N–1th sampling timepoint $t_{N-1}$, and the Nth sampling timepoint $t_N$) may be different from the timepoint $T_2$. The electronic device may determine candidate point cloud data acquired at the sampling timepoint $t_M$ closest to the timepoint $T_2$ as the second point cloud data.

However, the second point cloud data is not limited to being determined as one piece of the candidate point cloud data, and the electronic device may acquire the second point cloud data by complementing the candidate point cloud data. The electronic device may determine the point cloud data acquired by complementing the candidate point cloud data acquired at the sampling timepoint closest to the acquisition timepoint of the first point cloud data as the second point cloud data when all the plurality of sampling timepoints are different from the acquisition timepoint of the first point cloud data.

For example, the electronic device may determine the point cloud data acquired at the sampling timepoint having the smallest difference from the acquisition timepoint of the first point cloud data among the plurality of sampling timepoints as temporary point cloud data, in response to a case in which all the plurality of sampling timepoints are different from the acquisition timepoint of the first point cloud data.

The electronic device may complement the temporary point cloud data with the acquisition timepoint of the first point cloud data based on velocity information of the second sensor. The electronic device may determine the complemented temporary point cloud data as the second point cloud data. The second sensor may include a GNSS sensor and/or an IMU sensor, and the second sensor may acquire the velocity information of the second sensor through the GNSS sensor and/or the IMU sensor. When the first sensor is disposed on a first object and the second sensor is disposed on a second object that is moving and different from the first object, the position difference on the occupancy map may occur due to the difference between the acquisition timepoint of the first point cloud data based on the first sensor and the acquisition timepoint of the temporary point cloud data based on the second sensor. The electronic device may reduce errors due to the difference between the acquisition timepoint of the first point cloud data and the acquisition timepoint of the temporary point cloud data by complementing the temporary point cloud data based on the velocity information (e.g., the velocity information corresponding to the timepoint when the second sensor acquires the temporary point cloud data) of the second sensor.

Figure 5:
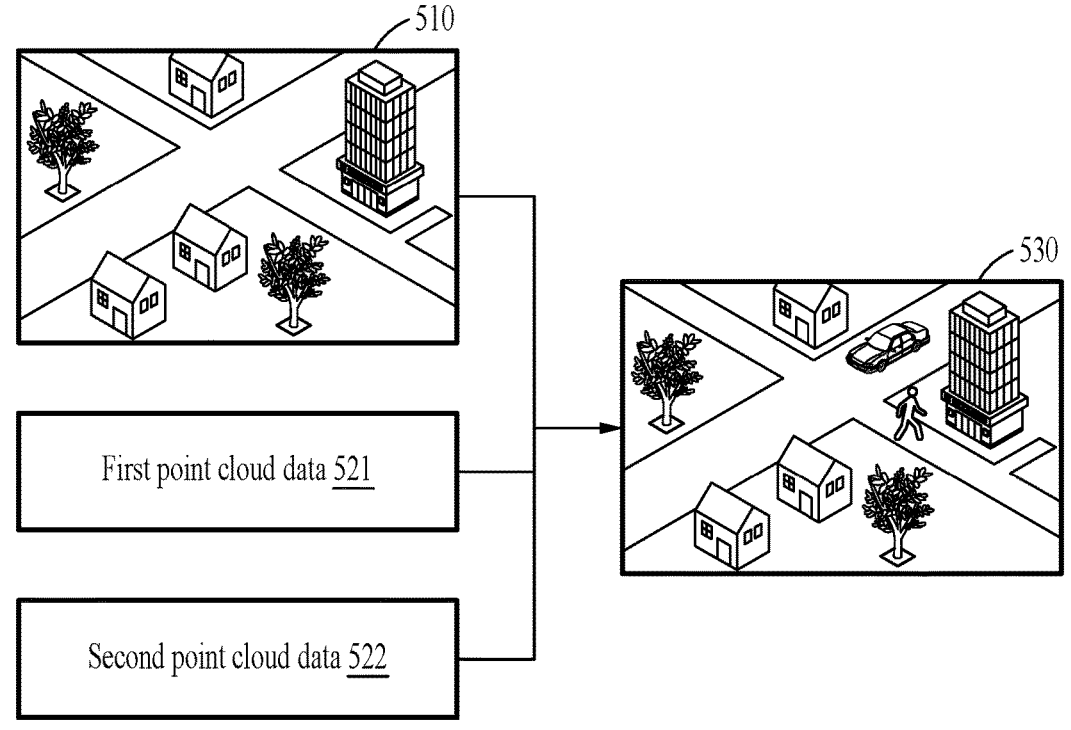
FIG. 5 illustrates an example operation of generating an occupancy map using a pre-rendered temporary occupancy map according to one or more embodiments.

FIG. 5 illustrates an example operation of generating an occupancy map using a pre-rendered temporary occupancy map according to one or more embodiments.

An electronic device (e.g., the electronic device 100 in FIG. 1) may generate an occupancy map 530 including occupancy information of a dynamic object using a pre-rendered temporary occupancy map 510 for a static object.

The electronic device may acquire the pre-rendered temporary occupancy map 510 for a static object positioned in at least one of the first sensing range or the second sensing range. For example, the electronic device may acquire occupancy information for the static object for a target area of the occupancy map 530. The static object may refer to an object having a fixed position and/or occupancy information over time. The static object may include, for example, a building, tree, traffic light, sign, pedestrian bridge, power pole, or pedestrian path.

The pre-rendered temporary occupancy map 510 may store a state of each point (or a partial area) as one of three states. For example, three states of the pre-rendered temporary occupancy map 510 may include a state of being occupied, unknown (or occupied by a static object), and un-occupied by a static object.

The pre-rendered temporary occupancy map 510 may only represent the occupancy information for the static object, and since other areas un-occupied by the static object are likely to be occupied by the dynamic object, the pre-rendered temporary occupancy map 510 may represent that an area un-occupied by the static object is also likely to be occupied by the dynamic object.

The pre-rendered temporary occupancy map 510 may be generated based on an area of which the state indicates to be occupied in every occupancy map 530 (or the occupancy map 530 greater than or equal to a predetermined number) generated over a plurality of timepoints included in the time interval. The time interval may be determined by design and, for example, may be set to one month or one year.

The electronic device may generate the occupancy map 530 including the occupancy information of the dynamic object. The dynamic object may refer to an object having a changeable position and/or the occupancy information over time. The dynamic object may include, for example, other moving objects (e.g., other vehicles) or people (e.g., pedestrians).

The dynamic object may be positioned in at least one of the first sensing range or the second sensing range in at least one of the acquisition timepoint of first point cloud data 521 or the acquisition timepoint of second point cloud data 522. The electronic device may acquire the occupancy information of the dynamic object based on at least one of the first point cloud data 521 or the second point cloud data 522. The electronic device may generate the occupancy map 530 by adding the occupancy information of the dynamic object to the pre-rendered temporary occupancy map 510.

Figure 6:
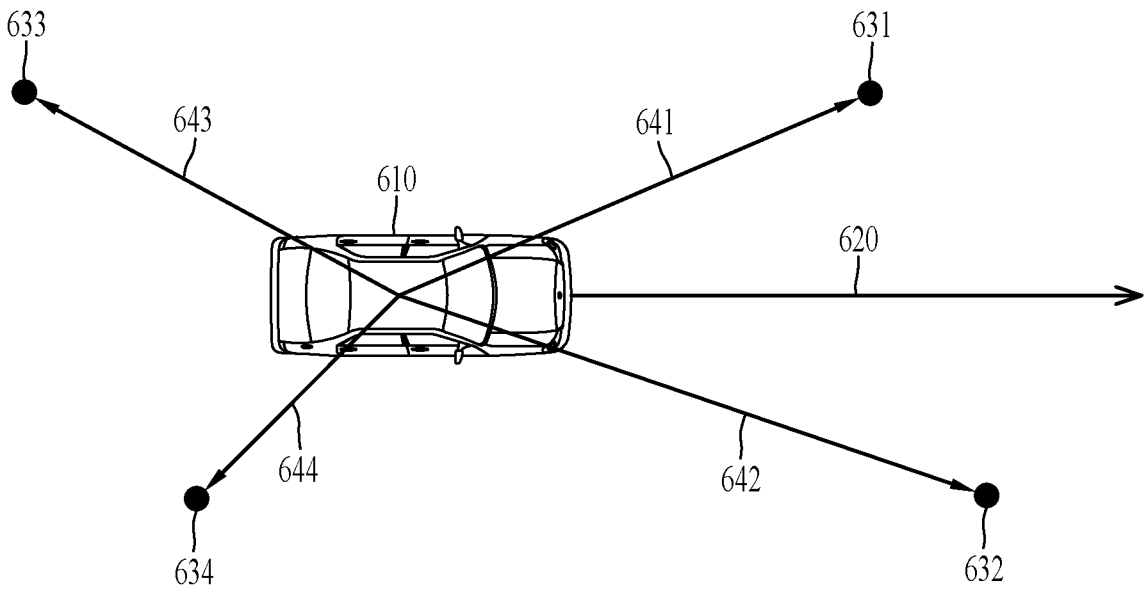
FIG. 6 illustrates an example operation of determining a second sensor when an electronic device detects surrounding information using one or more remote candidate sensors that are different from a first sensor of an electronic device according to one or more embodiments.

FIG. 6 illustrates an example operation of determining a second sensor when an electronic device detects a plurality of candidate sensors that is different from a first sensor according to one or more embodiments.

When detecting a plurality of candidate sensors that is different from the first sensor, an electronic device (e.g., the electronic device 100 in FIG. 1) may determine the second sensor among the plurality of candidate sensors.

The electronic device may determine the second sensor among the plurality of candidate sensors based on the difference between a direction from the moving object to each of the plurality of candidate sensors and a driving direction of the moving object in response to detecting the plurality of candidate sensors that is different from the first sensor. The electronic device may acquire the second point cloud data from the determined second sensor.

The driving direction of the moving object may refer to a direction in which the moving object is driving. For example, the driving direction of the moving object may be determined based on velocity information of the moving object. The first sensor may include a GNSS sensor and/or an IMU sensor, and the first sensor may acquire the velocity information of the first sensor through the GNSS sensor and/or the IMU sensor.

As shown in FIG. 6, the electronic device may detect the plurality of candidate sensors (e.g., a first candidate sensor 631, a second candidate sensor 632, a third candidate sensor 633, and a fourth candidate sensor 634) that is different from the first sensor (not shown).

The electronic device may determine a driving direction 620 of a moving object 610 on which the first sensor is disposed.

The electronic device may determine a direction (hereinafter, also referred to as 'a direction corresponding to a candidate sensor') from the moving object 610 to each candidate sensor. The electronic device may determine a first direction 641 corresponding to the first candidate sensor 631, a second direction 642 corresponding to the second candidate sensor 632, a third direction 643 corresponding to the third candidate sensor 633, and a fourth direction 644 corresponding to the fourth candidate sensor 634.

The electronic device may determine the second sensor among the plurality of candidate sensors based on the difference between a direction (e.g., the first direction 641, the second direction 642, the third direction 643, and the fourth direction 644) corresponding to each candidate sensor and the driving direction 620. The electronic device may determine a candidate sensor with the smallest difference between the direction corresponding to the candidate sensor and the driving direction 620 as the second sensor. When multiple candidate sensors, among the plurality of candidate sensors, are selected as the second sensor, the electronic device may determine the selected candidate sensors in order of the smallest difference between the direction corresponding each selected candidate sensor and the driving direction 620 as the second sensor.

When determining the second sensor among the plurality of candidate sensors, the second sensor is mainly described to be determined based on the driving direction of the moving object but is not limited thereto. The second sensor may be determined based on at least one of the sensing range of each of the candidate sensors or accuracy thereof.

The occupancy map acquired by the electronic device (e.g., the electronic device 100 in FIG. 1) may be used as a ground truth value of a training dataset of a machine learning model.

A machine learning model may refer to a model trained to output data corresponding to the occupancy map for a target area by being applied to input data for the target area. The machine learning model, for example, may include a neural network.

The input data may include sensing data acquired by a sensor (e.g., a single sensor). For example, the input data may include image data acquired through a camera sensor, lidar data acquired through a lidar sensor, radar data acquired through a radar sensor, or ultrasonic data acquired through an ultrasonic sensor.

The electronic device may acquire training input data corresponding to the timepoint (e.g., the acquisition timepoint of the first point cloud data) corresponding to the occupancy map. The electronic device may acquire a training dataset for training a machine learning model using the training input data and the occupancy map corresponding to the same timepoint as the training input and the ground truth value, respectively.

The processors, memories, electronic devices, apparatuses, and components described herein with respect to FIGS. 1-5 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular the"m "proces"or" "r "compu"er" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, Bd-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A processor-implemented method, the method comprising:

based on an overlapping area between a first sensing range of a first sensor and a second sensing range, of a second sensor, that includes an area occluded to the first sensor by an object in the first sensing range, generating an occupancy map by supplementing information about the occluded area among first point cloud data based on a corresponding portion of second point cloud data, wherein the first point cloud data corresponds to the first sensing range of the first sensor from a perspective of the first sensor of a moving object, where the first sensing range corresponds to a surrounding area of the moving object, wherein the second point cloud data corresponds to the second sensing range of the second sensor that is remote from the first sensor, where the second sensing range corresponds to a surrounding area of the second sensor, wherein an acquisition timepoint of the first point cloud data and an acquisition timepoint of the second point cloud data are a same timepoint or temporally adjacent to each other, and wherein the generating of the occupancy map comprises, among a plurality of voxels of the occupancy map, for each voxel comprised in the overlapping area, determining a voxel value of a corresponding voxel using a weight determined based on a distance between a position corresponding to the corresponding voxel and the first sensor and a distance between a position corresponding to the corresponding voxel and the second sensor.

2. The method of claim 1, wherein the generating of the occupancy map comprises:

acquiring a pre-rendered temporary occupancy map for a static object positioned in at least one of the first sensing range or the second sensing range; and generating the occupancy map comprising occupancy information of a dynamic object positioned in at least one of the first sensing range or the second sensing range in at least one of the acquisition timepoint of the first point cloud data or the acquisition timepoint of the second point cloud data.

3. The method of claim 1, wherein the generating of the occupancy map comprises generating the occupancy map for an area comprising at least a portion of the first sensing range or the second sensing range.

4. The method of claim 1, wherein the acquiring of the second point cloud data comprises:

acquiring candidate point cloud data corresponding to each of a plurality of sampling timepoints based on the second sensor; and determining the second point cloud data based on a corresponding piece of candidate point cloud data acquired at a sampling timepoint equal to or temporally adjacent to the acquisition timepoint of the first point cloud data among the acquired candidate point cloud data based on the second sensor.

5. The method of claim 4, wherein the determining of the second point cloud data comprises:

determining point cloud data acquired at a sampling timepoint having a determined smallest difference from the acquisition timepoint of the first point cloud data among the plurality of sampling timepoints as tempo-rary point cloud data, in response to all the plurality of sampling timepoints being different from the acquisi-tion timepoint of the first point cloud data;

complementing the temporary point cloud data with the acquisition timepoint of the first point cloud data based on velocity information of the second sensor; and determining the complemented temporary point cloud data as the second point cloud data.

6. The method of claim 1, wherein the generating of the occupancy map comprises:

acquiring first localization information of the first sensor corresponding to the acquisition timepoint of the first point cloud data;

acquiring second localization information of the second sensor corresponding to the acquisition timepoint of the second point cloud data; and performing the supplementing based on the first localiza-tion information and the second localization informa-tion.

7. The method of claim 1, further comprising:

determining the second sensor among a plurality of can-didate sensors based on a difference between a direc-tion from the moving object to each of the plurality of candidate sensors and a driving direction of the moving object; and generating the second point cloud data based on informa-tion captured by the determined second sensor.

8. The method of claim 1, further comprising:

determining a driving plan comprising a driving path of the moving object based on the generated occupancy map.

9. The method of claim 8, further comprising:

controlling a driving of the moving object based on the determined driving plan.

10. A non-transitory computer-readable storage medium storing instructions that, when executed by a processor, cause the processor to perform the method of claim 1.

11. The method of claim 1, further comprising generating the first point cloud data based on information captured by the first sensor and the second point cloud based on infor-mation captured by the second sensor.

12. The method of claim 1, wherein the supplementing includes supplementing the first point cloud data with the corresponding portion of the second point cloud data in the occluded area.

13. The method of claim 1, further based on the overlap-ping area:

determining the occluded area, included in the overlap-ping area, that is occluded to the first sensor by the object in the first sensing range; and in response to the determined area, performing the gen-erating of the occupancy map by performing the supplementing, with respect to the determined occluded area, of the first point cloud data with the portion of second point cloud data that corresponds to the determined occluded area.

14. An electronic device comprising:

a processor configured to: based on an overlapping area between the first sensing range of a first sensor and a second sensing range, of a second sensor, that includes an area occluded to the first sensor by an object in the first sensing range, generate an occupancy map by supplementing information about the occluded area among first point cloud data based on a corresponding portion of second point cloud data, wherein the first point cloud data corresponds to the first sensing range of the first sensor from a perspective of the first sensor of a moving object, where the first sensing range corresponds to a surrounding area of the moving object, wherein the second point cloud data corresponds to the second sensing range of the second sensor that is remote from the first sensor, where the second sensing range corresponds to a surrounding area of the second sensor, wherein an acquisition timepoint of the first point cloud data and an acquisition timepoint of the second point cloud data are a same timepoint or temporally adjacent to each other, and wherein, for the generation of the occupancy map, the processor is further configured to, among a plurality of voxels of the occupancy map, for each voxel comprised in the overlapping area, determine a voxel value of a corresponding voxel using a weight determined based on a distance between a position corresponding to the corresponding voxel and the first sensor and a distance between a position corresponding to the corresponding voxel and the second sensor.

15. The electronic device of claim 14, wherein, for the generation of the occupancy map, the processor is further configured to:

acquire a pre-rendered temporary occupancy map for a static object positioned in at least one of the first sensing range or the second sensing range; and generate the occupancy map comprising occupancy infor-mation of a dynamic object positioned in at least one of the first sensing range or the second sensing range in at least one of the acquisition timepoint of the first point cloud data or the acquisition timepoint of the second point cloud data.

16. The electronic device of claim 14, wherein, for the generation of the occupancy map, the processor is further configured to generate the occupancy map for an area comprising at least a portion of the first sensing range or the second sensing range.

17. The electronic device of claim 14, wherein the pro-cessor is further configured to:

acquire candidate point cloud data corresponding to each of a plurality of sampling timepoints based on the second sensor; and determine the second point cloud data based on a corresponding piece of candidate point cloud data acquired at a sampling timepoint equal to or temporally adjacent to the acquisition timepoint of the first point cloud data among the acquired candidate point cloud data based on the second sensor.

18. The electronic device of claim 17, wherein, for the determination of the second point cloud data, the processor is further configured to:

determine point cloud data acquired at a sampling timepoint having a smallest difference from the acquisition timepoint of the first point cloud data among the plurality of sampling timepoints as temporary point cloud data, in response to all the plurality of sampling timepoints being different from the acquisition timepoint of the first point cloud data;

complement the temporary point cloud data with the acquisition timepoint of the first point cloud data based on velocity information of the second sensor; and determine the complemented temporary point cloud data as the second point cloud data.

19. The electronic device of claim 14, wherein the processor is further configured to:

acquire first localization information of the first sensor corresponding to the acquisition timepoint of the first point cloud data;

acquire second localization information of the second sensor corresponding to the acquisition timepoint of the second point cloud data; and perform the supplementing based on the first localization information and the second localization information.

20. The electronic device of claim 14, wherein the processor is further configured to:

determine the second sensor among a plurality of candidate sensors based on a difference between a direction from the moving object to each of the plurality of candidate sensors and a driving direction of the moving object; and generate the second point cloud data based on information captured by the determined second sensor.

21. The electronic device of claim 14, wherein the processor is further configured to:

determine a driving plan comprising a driving path of the moving object based on the generated occupancy map; and control a driving of the moving object based on the determined driving plan.

* * * * *